United States Patent
Ouchi

(10) Patent No.: US 9,551,918 B2
(45) Date of Patent: Jan. 24, 2017

(54) IMAGE PROCESSING APPARATUS, IMAGE PROCESSING METHOD, AND COMPUTER-READABLE STORAGE MEDIUM

(71) Applicant: CANON KABUSHIKI KAISHA, Tokyo (JP)

(72) Inventor: Akihiro Ouchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 106 days.

(21) Appl. No.: 14/559,743

(22) Filed: Dec. 3, 2014

(65) Prior Publication Data
US 2015/0156467 A1    Jun. 4, 2015

(30) Foreign Application Priority Data
Dec. 4, 2013 (JP) .................. 2013-251393

(51) Int. Cl.
*G03B 21/14* (2006.01)
*H04N 9/31* (2006.01)

(52) U.S. Cl.
CPC .......... *G03B 21/147* (2013.01); *H04N 9/3185* (2013.01); *H04N 9/3194* (2013.01)

(58) Field of Classification Search
CPC .... H04N 9/3185; H04N 9/3194; G03B 21/147
See application file for complete search history.

(56) References Cited

U.S. PATENT DOCUMENTS

| | | | | |
|---|---|---|---|---|
| 2004/0061838 A1* | 4/2004 | Mochizuki | ............... | H04N 5/74 353/69 |
| 2010/0053569 A1* | 3/2010 | Furui | .................. | H04N 9/3194 353/70 |
| 2014/0285777 A1* | 9/2014 | Inoue | .................. | H04N 9/3185 353/70 |

FOREIGN PATENT DOCUMENTS

JP    3996610 B2    10/2007

* cited by examiner

*Primary Examiner* — Sultan Chowdhury
*Assistant Examiner* — Magda Cruz
(74) *Attorney, Agent, or Firm* — Canon U.S.A., Inc. IP Division

(57) ABSTRACT

An image processing apparatus includes an analyzing unit, a changing unit, and a control unit. The analyzing unit analyzes a projection image projected by a projection unit. The changing unit changes, depending on an analysis result obtained by the analyzing unit for the projection image, dimensions of the projection image projected by the projection unit so as to obtain a resized projection image. The control unit performs control for correcting a distortion of the projection image projected by the projection unit, in accordance with an analysis result obtained by the analyzing unit for the resized projection image.

14 Claims, 8 Drawing Sheets

IMAGE PROCESSING APPARATUS, IMAGE PROCESSING METHOD, AND COMPUTER-READABLE STORAGE MEDIUM

BACKGROUND OF THE INVENTION

Field of the Invention

The present invention relates to correction of a distortion of a projection image in a projection-type image display system.

Description of the Related Art

A technique for correcting a distortion of a projection image projected by a projector by capturing an image of the projection image and calculating a distortion correction parameter from the captured image is available.

Japanese Patent No. 3996610 discloses that a distortion is corrected by reducing the dimensions of a projection image projected by a projector in the case where the projection image is larger than a screen. More specifically, the projector projects images obtained by reducing dimensions of the full-size projection image to 75% and 50%, and captures images of the individual projection images. The projector then calculates the position of the full-size projection image projected by the projector and corrects a distortion of the full-size projection image.

However, a distortion of a projection image may not be appropriately corrected depending on the dimensions of the projection image.

For example, in an example described in Japanese Patent No. 3996610, in the case where a range occupied by the projection image is not identifiable using a projection image obtained by reducing the dimensions of the full-size projection image to 75%, a distortion of the projection image may not be appropriately corrected.

SUMMARY OF THE INVENTION

An aspect of the present invention enables a distortion of a projection image to be corrected more effectively.

An aspect of the present invention provides an image processing apparatus including an analyzing unit configured to analyze a projection image projected by a projection unit, a changing unit configured to change, depending on an analysis result obtained by the analyzing unit for the projection image, dimensions of the projection image projected by the projection unit so as to obtain a resized projection image, and a control unit configured to perform control for correcting a distortion of the projection image projected by the projection unit, in accordance with an analysis result obtained by the analyzing unit for the resized projection image.

Further features of the present invention will become apparent from the following description of exemplary embodiments with reference to the attached drawings.

DESCRIPTION OF THE EMBODIMENTS

Embodiments of the present invention will be described below with reference to the accompanying drawings.

First Embodiment

Figure 1:
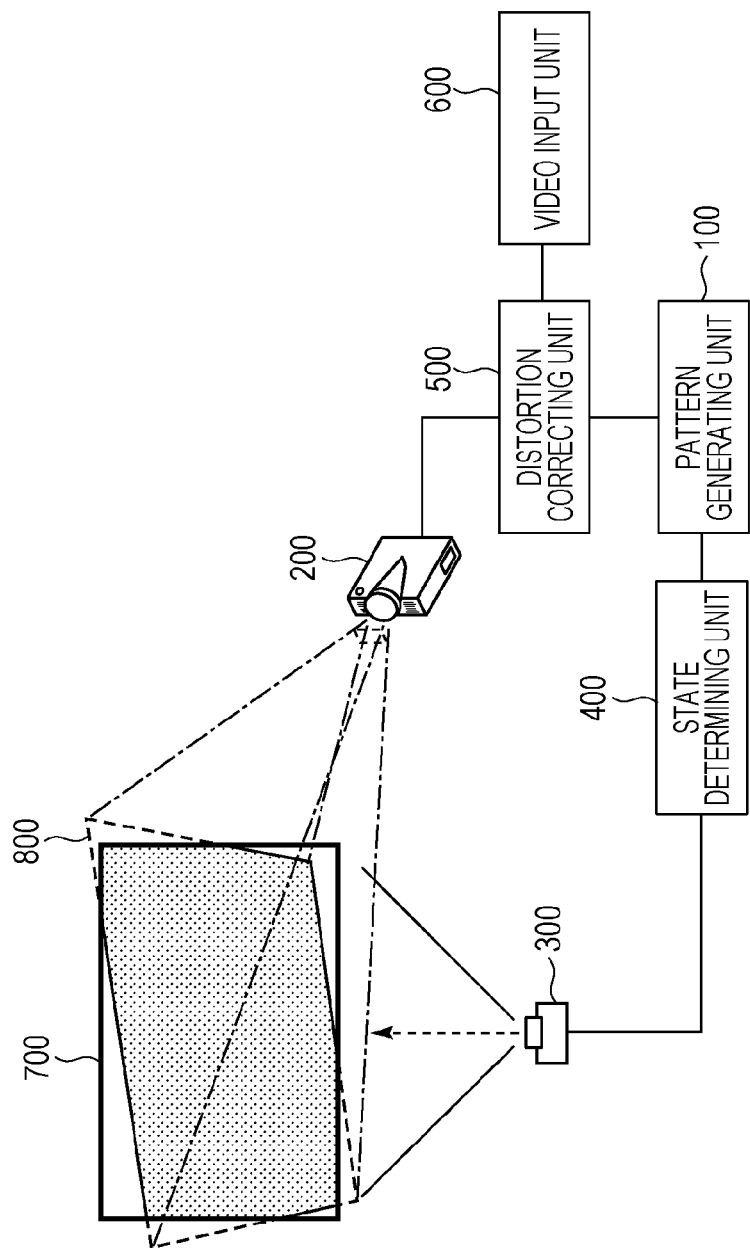
FIG. 1 is a block diagram of a projection-type image display system according to a first embodiment.

FIG. 1 illustrates an example of a configuration of a projection-type image display system according to a first embodiment of the present invention. The projection-type image display system includes a pattern generating unit 100, a projection unit 200, an image capturing unit 300, a state determining unit 400, a distortion correcting unit 500, a video input unit 600, and a screen 700.

In the first embodiment, an example in which the pattern generating unit 100, the projection unit 200, the state determining unit 400, the distortion correcting unit 500, and the video input unit 600 are included in a single image processing apparatus will be described; however, the configuration is not limited to this example. For example, the image capturing unit 300 may be included in the image processing apparatus, or the projection unit 200 may be provided as a separate apparatus from the image processing apparatus.

A test pattern generated by the pattern generating unit 100 is projected onto the screen 700 by the projection unit 200. Referring to FIG. 1, a configuration is made such that a test pattern generated by the pattern generating unit 100 is subjected to necessary distortion correction performed by the distortion correcting unit 500 and then is projected; however, the configuration is not limited to this one. For example, the pattern generating unit 100 may be provided between the distortion correcting unit 500 and the projection unit 200. Alternatively, the pattern generating unit 100 may be configured to read out a pre-stored test pattern. Also, in the first embodiment, an example of projecting a test pattern in order to correct a distortion of a projection image will be described; however, the configuration is not limited to this example. For example, distortion correction may be performed on the basis of a given projection image other than the test pattern. The video input unit 600 operates to receive a video signal supplied from outside. The video input unit 600 is capable of receiving a video signal from a personal computer (PC) or the like or a video signal via a connection to the Internet or the like.

The image capturing unit 300 captures an image of the screen 700 onto which an image (test pattern) is projected by the projection unit 200, and supplies the captured image to the state determining unit 400.

The state determining unit 400 detects vertexes of the test pattern from the captured image obtained from the image capturing unit 300. If the state determining unit 400 has successfully detected the vertexes of the test pattern, the state determining unit 400 supplies information concerning positions of the detected vertexes to the distortion correcting unit 500. If the state determining unit 400 has failed to detect any one of the vertexes of the test pattern, the state determining unit 400 notifies the pattern generating unit 100 that detection of vertexes is unsuccessful. Upon receiving the notification indicating unsuccessful detection of vertexes, the pattern generating unit 100 according to the first embodiment reduces the projection dimensions of the test pattern.

Based on the vertex position information supplied from the state determining unit 400, the distortion correcting unit 500 determines an amount of correction used to correct a distortion of the projection image and controls the projection unit 200. Details about a process performed by the distortion correcting unit 500 will be described later.

Figure 2:
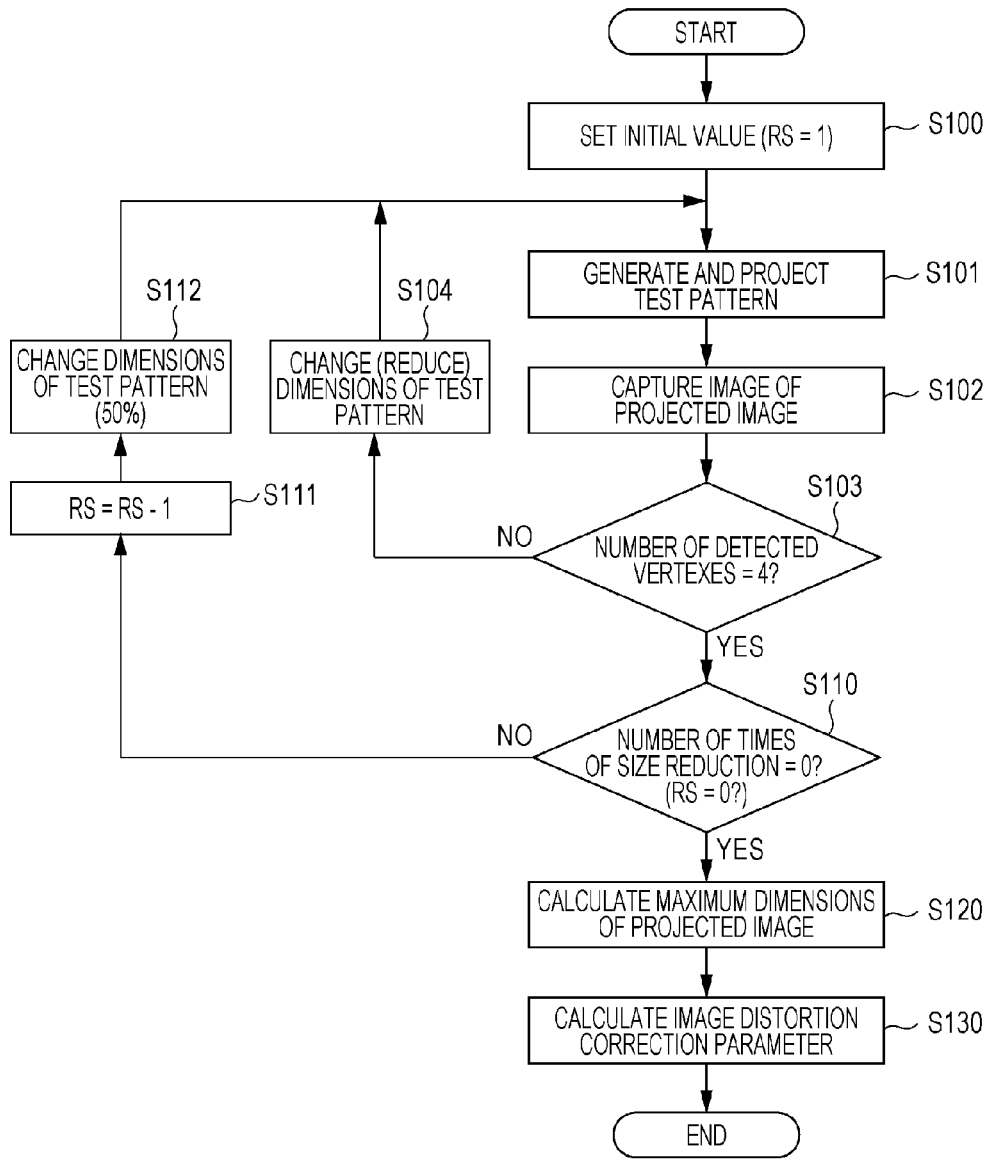
FIG. 2 is a flowchart for describing an operation performed by an image processing apparatus according to the first embodiment.

An operation performed by the image processing apparatus according to the first embodiment will be described with reference to a flowchart of FIG. 2. The image processing apparatus according to the first embodiment includes a central processing unit (CPU) (not illustrated), and implements individual processing steps illustrated in FIG. 2 as a result of the CPU reading out a program necessary for execution of the process illustrated in FIG. 2 from a memory (not illustrated) and executing the program.

In step S100, the state determining unit 400 initializes a reduction count value RS, which represents the number of times reduction is performed, to 1. Subsequently, in step S101, the pattern generating unit 100 generates a test pattern that is as large as a display area of the projection unit 200. Then, the generated test pattern is projected by the projection unit 200.

In step S102, the image capturing unit 300 captures an image of the screen 700 onto which the test pattern is projected. Then, in step S103, the state determining unit 400 detects vertexes of the test pattern from the captured image obtained by the image capturing unit 300. In the first embodiment, an example in which the state determining unit 400 detects four vertexes of a projected rectangular test pattern will be described; however, the shape of the test pattern and the number of vertexes to be detected are not limited to those used in the above example. Also, the detection target need not be vertexes, and it is sufficient that a boundary between an area of a projected test pattern and an area in which the test pattern is not projected is identifiable. That is, the state determining unit 400 analyzes a captured image (test pattern) obtained by the image capturing unit 300, and detects predetermined coordinates (e.g., coordinates corresponding to each vertex of the projection image).

In step S103, the state determining unit 400 determines a projection state based on whether or not all the four vertexes of the test pattern have been successfully detected. If all the four vertexes have been successfully detected, the process proceeds to step S110. If any one of the four vertexes has not been detected, the process proceeds to step S104.

The pattern generating unit 100 according to the first embodiment generates a test pattern enabling identification of vertexes. Specifically, the pattern generating unit 100 generates a test pattern in which at least one of luminance and color is made different at vertexes, for example. Alternatively, the pattern generating unit 100 can generate a test pattern having a pattern indicating the center of the test pattern (e.g., a test pattern having diagonals each connecting a pair among the four vertexes). By generating a test pattern from which vertexes are identifiable in this manner, false determination of vertexes can be suppressed in the cases such as the case where a projection area of the test pattern matches the screen 700.

Also, the state determining unit 400 is capable of determining whether or not the test pattern is projected onto the screen 700 based on luminance values on the screen 700. In the case where the test pattern has a pattern indicating the center of the test pattern, the state determining unit 400 is capable of determining whether or not the entire test pattern is projected onto the screen 700 based on whether line segments each connecting diagonal vertexes of the projection image pass the center of the test pattern.

Figure 3A:
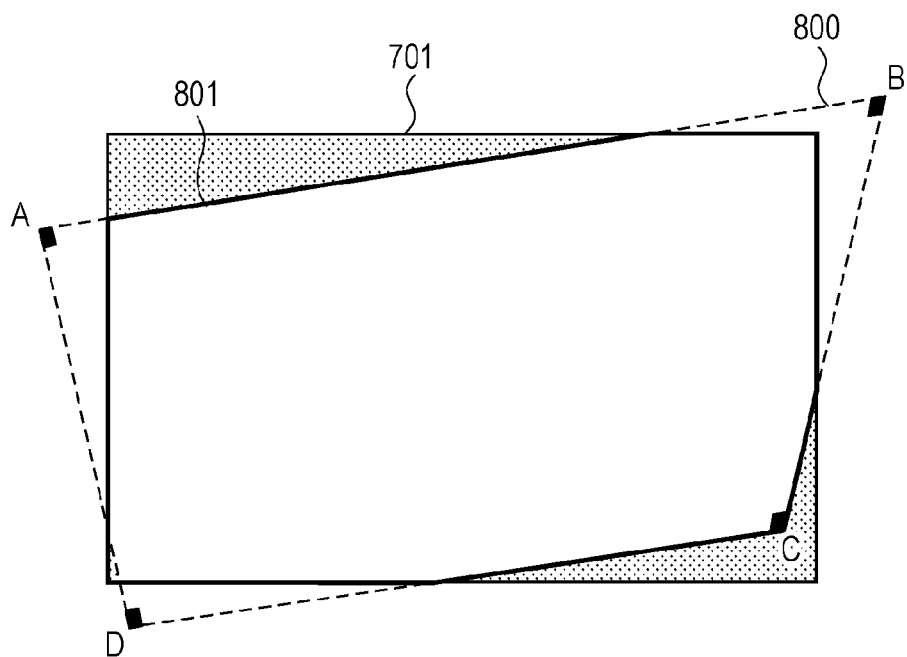
FIGS. 3A and 3B are diagrams each illustrating a state of a projected test pattern.

In the case where a projection image 800 extends off a screen surface 701 as illustrated in FIG. 3A, the state determining unit 400 according to the first embodiment fails to detect vertexes A, B, and D of the projection image 800.

In this case, the process proceeds to step S104, in which the state determining unit 400 notifies the pattern generating unit 100 that detection of vertexes is unsuccessful. Upon receipt of this notification, the pattern generating unit 100 reduces the dimensions of the test pattern. The process then returns to step S101.

That is, the pattern generating unit 100 changes the dimensions of the test pattern in step S104, depending on an analysis result (result of detecting the predetermined coordinates) obtained in step S103. In step S104, the pattern generating unit 100 according to the first embodiment equally reduces vertical and horizontal dimensions of the original test pattern to 75%; however, the reduction ratio can be decided in any given manner. Also, it is assumed that the center of the original test pattern and the center of the reduced test pattern coincide with the center of the maximum projection screen (i.e., the center of a projection image obtained when the projection unit 200 projects an image at the maximum projection dimensions). Processing of steps S101 to S104 is repeatedly performed until the state determining unit 400 successfully detects four vertexes in step S103.

Figure 3B:
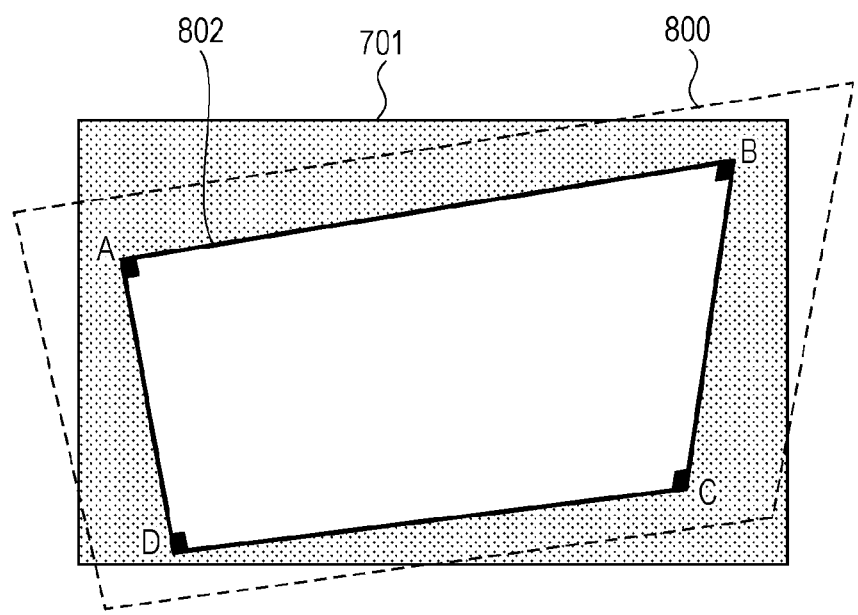

If the vertexes A, B, C, and D of a projection image 802 on the screen surface 701 are successfully detected as illustrated in FIG. 3B, for example, as a result of repetition of steps S101 to S104, the process proceeds to step S110. In the first embodiment, it is assumed that four vertexes A, B, C, and D of the projection image 802 of the test pattern obtained by equally reducing the vertical and horizontal dimensions of the display area to 75% are successfully detected.

In step S110, the state determining unit 400 determines whether or not the reduction count value RS is equal to 0. In the first embodiment, the reduction count value RS is initialized to 1. Thus, it is determined that the reduction count value RS is not equal to 0, and the process proceeds to step S111. In step S111, 1 is subtracted from the reduction count value RS (RS=RS−1), and the process proceeds to step S112.

In step S112, the pattern generating unit 100 generates a test pattern by reducing the current dimensions to 50%. The process then returns to step S101. In the first embodiment, the test pattern is generated by equally reducing, to 50%, the vertical and horizontal dimensions of the resized test pattern which is obtained by equally reducing the vertical and horizontal dimensions of the display area to 75%.

In the first embodiment, the reduction count value RS is initialized to 1; however, the initial value may be set equal to a value greater than or equal to 2. The pattern generating unit 100 generates test patterns, the number of which is based on the initial value of the reduction count value RS, by reducing the dimensions of another test pattern whose four vertexes have been successfully detected.

In the first embodiment, the reduction count value RS is initialized to 1. Thus, a second test pattern is generated by reducing the dimensions of a first test pattern whose four vertexes have been successfully detected to 50%. The process then proceeds to step S120. For example, when the reduction count value RS is initialized to 2, the pattern generating unit 100 generates a second test pattern by reducing the dimensions of a first test pattern whose four vertexes have been successfully detected to 50%, and a third test pattern by reducing the dimensions of the second test pattern to 50%. The image capturing unit 300 sends captured images of the individual test patterns to the state determining unit 400.

In step S120, the distortion correcting unit 500 determines the maximum projection dimensions from the captured images of the plurality of test patterns whose four vertexes have been successfully detected. Specifically, the distortion correcting unit 500 determines the dimensions of the projection image 800 that is projected by the projection unit 200 without performing reduction.

In this embodiment, the two test patterns whose four vertexes have been successfully detected are the projection image 802 which obtained by equally reducing the vertical and horizontal dimensions of the display area of the projection unit 200 to 75% (Rate2), and a projection image 803 which is obtained by equally reducing the horizontal and vertical dimensions of the projection image 802 to 50% (Rate3). That is, the projection image 803 is obtained by equally reducing the vertical and horizontal dimensions of the display area to 37.5%. The distortion correcting unit 500 according to the first embodiment calculates positions of the vertexes of the projection image 800 on the basis of the positions of the vertexes of the projection images 802 and 803. That is, the distortion correcting unit 500 identifies an area occupied by the original projection image (i.e., the projection image 800) on the basis of the test patterns for which a predetermined number of (four) vertexes have been successfully detected and the percentage values (Rate) to which the dimensions of the test patterns are changed.

Figure 4:
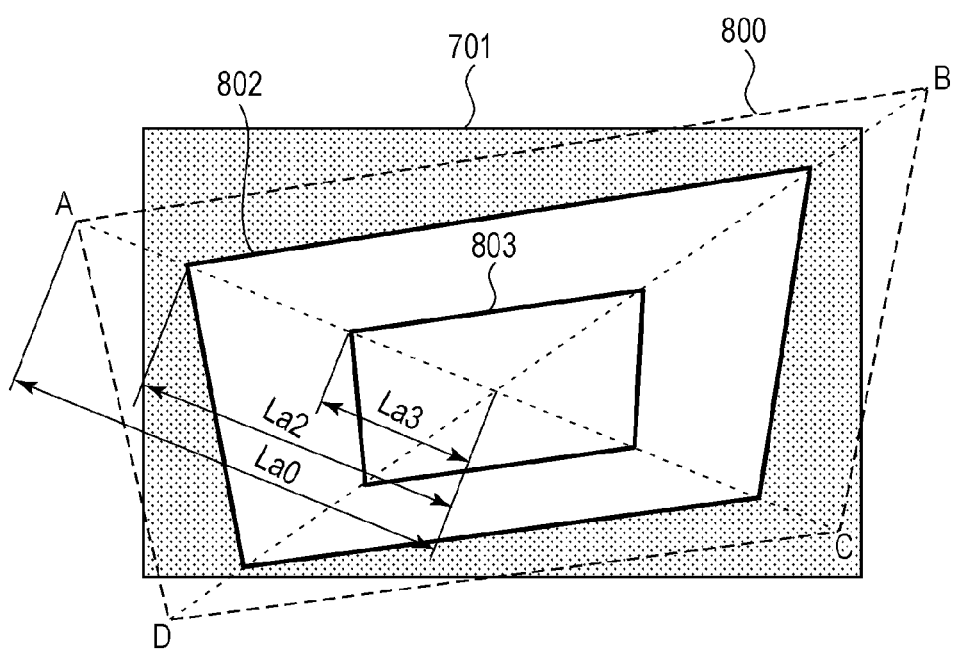
FIG. 4 is a diagram illustrating a method for calculating the maximum projection image dimensions.

Referring for example to FIG. 4, a method for calculating the position of the upper left vertex A of the projection image 800 will be described. Let La3, La2, and La0 denote distances from the center of the test patterns to the upper left vertexes of the projection images 803, 802, and 800, respectively.

Distances from the center of the test patterns to the upper left vertexes of the projection images 803, 802, and 800 are in linear proportion to each other. For example, the distance La2 from the center of the test pattern to the upper left vertex of the projection image 802 is twice as long as the distance from the center of the test pattern to the upper left vertex of the projection image 803 which is obtained by reducing the dimensions of the projection image 802 to 50%.

That is, a relationship between a reduction ratio (Rate) of the test pattern and a distance (La) from the center of the test pattern to the upper left vertex A of each projection image is expressed by Equation below, where α is a constant.

$$La = \alpha * Rate$$

$$\alpha = (La2 - La3)/(Rate2 - Rate3)$$

Accordingly, the distance La0 from the center of the test pattern to the upper left vertex A of the projection image 800 is calculated such that $La0 = 100 * \alpha$. The distortion correcting unit 500 calculates distances from the center of the test pattern for the other vertexes B, C, and D of the projection image 800. In this way, the distortion correcting unit 500 can identify the dimensions of the projection image 800.

After the distortion correcting unit 500 determines positions of the vertexes A, B, C, and D of the projection image 800 from the distances from the center of the test pattern to the vertexes A, B, C, and D of the projection image 800, respectively, the process proceeds to step S130. In step S130, the distortion correcting unit 500 calculates a distortion correction parameter from a relationship between the positions of the individual vertexes A, B, C, and D of the projection image 800 determined in step S120 and a target image shape achieved by distortion correction.

Figure 8A:
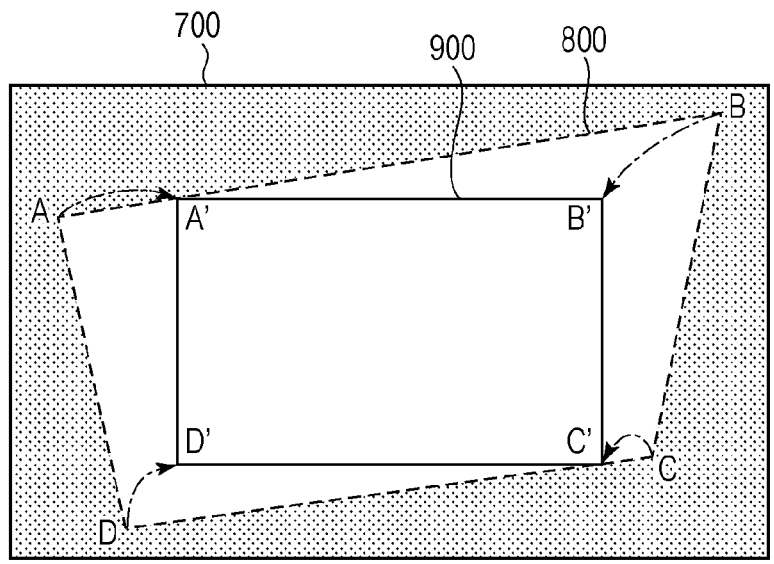
FIGS. 8A to 8C are diagrams illustrating a method for correcting a distortion.
Figure 8B:
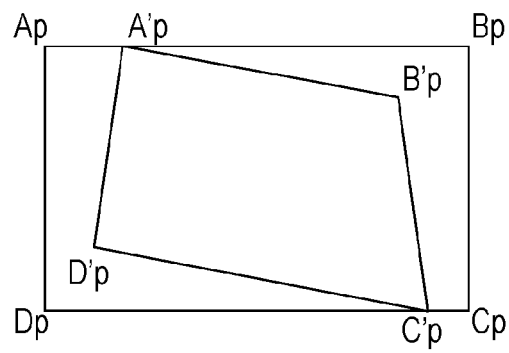
Figure 8C:
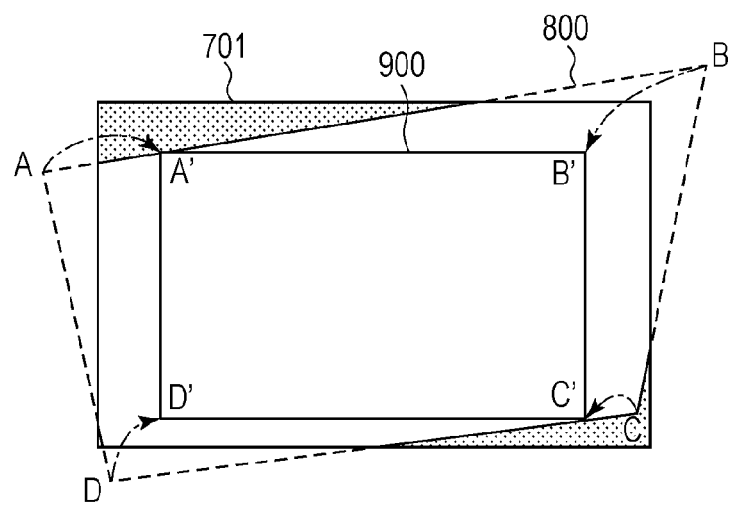

More specifically, in the case where the projection image 800 is distorted as illustrated in FIG. 8C, the distortion correcting unit 500 determines a distortion correction parameter in the following manner. First, the distortion correcting unit 500 determines a coordinate transformation formula used to transform coordinates of the four vertexes A, B, C, and D of the projection image 800 projected onto the screen surface 701 into coordinates of vertexes Ap, Bp, Cp, and Dp of the display area of the projection unit 200 as illustrated in FIG. 8B, respectively. Then, the distortion correcting unit 500 determines coordinates of points A'p, B'p, C'p, and D'p on the display area of the projection unit 200 from coordinates of points A', B', C', and D' on the screen 700, respectively. Then, the distortion correcting unit 500 calculates a distortion correction parameter from differences between the coordinates of the vertexes Ap, Bp, Cp, and Dp and the coordinates of the points A'p, B'p, C'p, and D'p on the display area of the projection unit 200. In this way, a distorted projection image such as the projection image 800 illustrated in FIG. 8C can be corrected into a target image shape 900.

That is, the distortion correcting unit 500 associates coordinates on the screen 700 with coordinates on the display area of the projection unit 200. Then, the distortion correcting unit 500 transforms the coordinates of the vertexes A', B', C', and D' of the target image shape 900 on the screen 700 into the coordinates of the points A'p, B'p, C'p, and D'p on the display area of the projection unit 200. Then, the distortion correcting unit 500 determines an amount of correction used to correct a distortion on the basis of the differences between the coordinates of the vertexes Ap, Bp, Cp, and Dp on the display area and the coordinates of the points A'p, B'p, C'p, and D'p. The method for determining a distortion correction parameter is not limited to the above-described method, and various available methods can be used. Also, FIG. 8A is a diagram illustrating the case where the projection image 800 projected at the maximum projection dimensions fits within the screen 700.

As described above, in the case where four vertexes (predetermined coordinates) are not successfully detected from a projection image, the image processing apparatus according to the first embodiment reduces the dimensions of the projection image. If four vertexes are detected from the reduced projection image, the image processing apparatus determines positions of the vertexes of the original projection image by using positions of the detected vertexes and corrects a distortion. Such a process enables more accurate distortion correction even in the case where a projection image projected by the projection image is larger than the screen 700, for example.

In the first embodiment, the example of using a test pattern for which four vertexes are successfully detected for the first time and a test pattern obtained by one more reduction has been described; however, the distortion correcting unit 500 may correct a distortion by using the test pattern for which four vertex are successfully detected for the first time. Specifically, the distortion correcting unit 500 may identify positions of the vertexes of the projection image 800 from the four vertexes of the text pattern for which four vertexes are successfully detected for the first time and a reduction ratio of the test pattern and determine a distortion correction parameter.

Alternatively, a distortion can be corrected by using three or more test patterns. In the case where three or more test patterns are used, α of the above-described formula is determined for each combination of test patterns used, and the resulting values of α are averaged to reduce errors. Also, in the first embodiment, the test patterns are described as patterns filled in white; however, the test patterns are not limited to this type.

Also, in the first embodiment, the example of analyzing a projection image by using a captured image of the screen 700 has been described; however, the method for analyzing is not limited to this one. Examples of another method include a method in which the image processing apparatus acquires luminance information detected by a luminance sensor provided on the screen 700 and analyzes the projection image using the acquired luminance information.

Second Embodiment

Now, a second embodiment will be described by focusing on its differences from the first embodiment. A major difference between the second embodiment and the first embodiment is that a reduced test pattern is projected first and the test pattern is enlarged when four vertexes of the test pattern are successfully detected. Note that an image to be projected is not limited to a test pattern and any given image data can be used, which is the same as the first embodiment.

Figure 5:
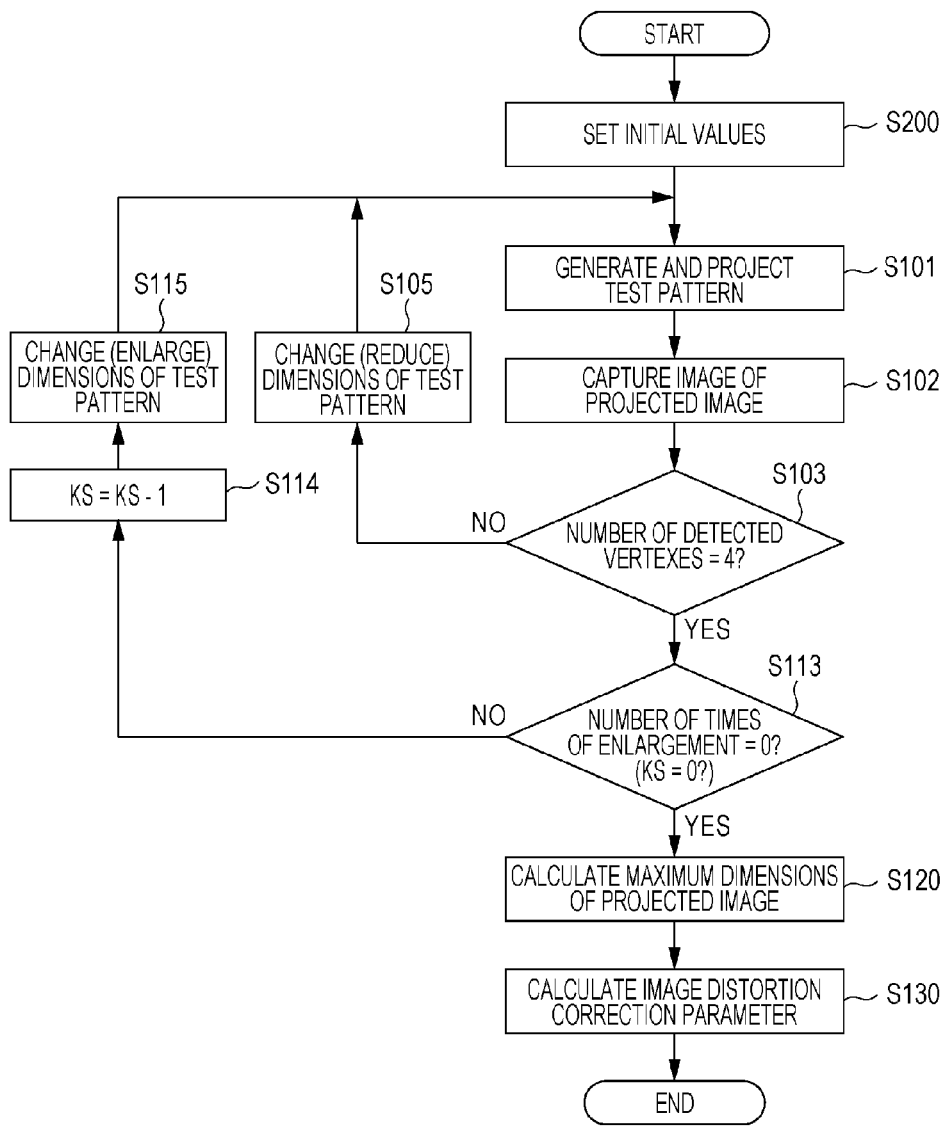
FIG. 5 is a flowchart for describing an operation performed by an image processing apparatus according to a second embodiment.

An operation performed by an image processing apparatus according to the second embodiment will be described with reference to a flowchart of FIG. 5. Steps corresponding to steps illustrated in FIG. 2 are assigned the same step numbers. The image processing apparatus according to the second embodiment includes a CPU (not illustrated), and implements individual processing steps illustrated in FIG. 5 as a result of the CPU reading out a program necessary for execution of the process illustrated in FIG. 5 from a memory (not illustrated) and executing the program.

In step S200, initial values of an enlargement count value KS which represents the number of times enlargement is performed, a reduction ratio SR, a previous reduction ratio ZDB, and a previous enlargement ratio ZUB are set. In this exemplary embodiment, the enlargement count value KS is set equal to 10, the reduction ratio SR is set equal to 50%, the previous reduction ratio ZDB is set equal to 0%, and the previous enlargement ratio ZUB is set equal to 100%. The individual parameters will be described later.

In step S101, the pattern generating unit 100 generates a test pattern by reducing the original dimensions using the reduction ratio SR initially set. Then, in step S101, the projection unit 200 projects the test pattern. In the second embodiment, because the reduction ratio SR is initially set equal to 50%, a test pattern obtained by equally reducing the vertical and horizontal dimensions of the display area of the projection unit 200 to 50% is projected.

In step S102, the image capturing unit 300 captures an image of the screen 700 onto which the test pattern is projected. Then, in step S103, the state determining unit 400 detects vertexes of the test pattern from the captured image obtained by the image capturing unit 300. That is, the state determining unit 400 analyzes a projection image projected by the projection unit 200. If any one of four vertexes is not successfully detected from the captured image in step S103, the process proceeds to step S105. In step S105, the pattern generating unit 100 reduces the dimensions of the test pattern. Specifically, the pattern generating unit 100 sets an intermediate reduction ratio between the previous reduction ratio ZDB and the reduction ratio SR currently used. If the process has proceeded to step S105 for the first time after the process flow illustrated in FIG. 5 has been started, the previous reduction ratio ZDB is equal to 0% and the reduction ratio SR currently used is equal to 50%. Thus, the reduction ratio SR is changed to 25% in step S105. Also, in step S105, the pattern generating unit 100 sets the larger one of the previous reduction ratio ZDB and the reduction ratio SR currently used as the previous enlargement ratio (i.e., ZUB=50%) and sets the smaller one as the previous reduction ratio (i.e., ZDB=0%). The process then returns to step S101.

If the process has proceeded to step S105 in the middle of the process flow and the reduction ratio SR currently used is equal to 75% and the previous reduction ratio ZDB is equal to 50%, the reduction ratio SR is set equal to 62.5%, the previous reduction ratio ZDB is set equal to 50%, and the previous enlargement ratio ZUB is set equal to 75%. After reduction of the dimensions of the test pattern and updating of the parameters have been finished, the process returns to step S101.

If the state determining unit 400 has successfully detected four vertexes from the captured image in step S103, the process proceeds to step S113. In step S113, the state determining unit 400 determines whether or not the enlargement count value KS is equal to 0. If the enlargement count value KS is not equal to 0, 1 is subtracted from the enlargement count value KS (KS=KS−1) in step S114. Then, the process proceeds to step S115.

In step S115, the pattern generating unit 100 enlarges the test pattern to an intermediate reduction ratio between the previous enlargement ratio ZUB and the reduction ratio SR currently used. That is, in the case where the state determining unit 400 has successfully detected a predetermined number of (four) vertexes as a result of an analysis of a projection image, the pattern generating unit 100 according to the second embodiment enlarges the projection image projected by the projection unit 200. In the case where the process has proceeded to step S115 for the first time without proceeding to step S105 after the process flow illustrated in FIG. 5 has been started, the previous enlargement ratio ZUB is equal to 100% and the reduction ratio SR currently used is equal to 50%. Thus, the reduction ratio SR is set equal to 75%.

Also, the larger one of the previous enlargement ratio ZUB and the reduction ratio SR currently used is set as the previous enlargement ratio (i.e., ZUB=100%) and the smaller one is set as the previous reduction ratio (ZDB=50%). The process then returns to step S101. In addition, in the case where the process has proceeded to S115 and the reduction ratio SR currently used is equal to 75% and the previous enlargement ratio ZUB is equal to 100%, the reduction ratio SR is set equal to 87.5%, the previous reduction ratio ZDB is set equal to 75%, and the previous enlargement ratio ZUB is set equal to 100% after the enlargement. The process then returns to step S101.

Steps S101 to S113 are repeatedly performed until the enlargement count value KS becomes equal to 0 in step S113. If the enlargement count value KS becomes equal to 0 in step S113, the process proceeds to step S120. That is, in the case where four vertexes of a test pattern having first dimensions have been successfully detected from a captured image of the test pattern, the pattern generating unit 100 according to the second embodiment enlarges the dimensions of the test pattern to a certain ratio to obtain a test pattern having second dimensions, and causes the projection unit 200 to project the resulting test pattern having the second dimensions. In the case where any of four vertexes of the test pattern having the second dimensions resulting from the enlargement has not successfully detected from a captured image of the test pattern, the pattern generating unit 100 generates a test pattern having third dimensions which is larger than the test pattern having the first dimensions and smaller than the test pattern having the second dimensions, and causes the projection unit 200 to projects the generated test pattern.

If it is determined by the state determining unit 400 in step S113 that the enlargement count value KS becomes equal to 0, the process proceeds to step S120. In step S120, the distortion correcting unit 500 determines an amount of correction for the projection image projected by the projection unit 200, on the basis of positions of the four vertexes detected from each of the captured images of the one or plurality of test patterns.

As described above, the image processing apparatus according to the second embodiment reduces or enlarges the dimensions of the test pattern in accordance with the detection state of the vertexes of the projection images. With this configuration, a distortion can be corrected on the basis of positions of the vertexes of the largest test pattern among dimensions in which the whole projection image (test pattern) is projected onto the screen 700.

Third Embodiment

Now, a third embodiment will be described by focusing on its differences from the first and second embodiments. A feature of the third embodiment is content of a test pattern projected by the projection unit 200.

Figure 6A:
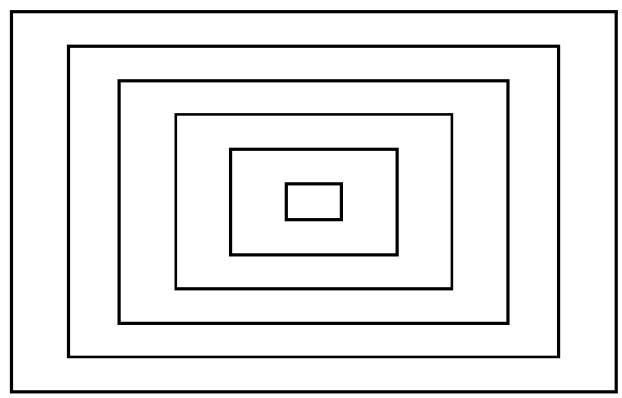
FIGS. 6A and 6B are diagrams each illustrating a test pattern used in a third embodiment.
Figure 6B:
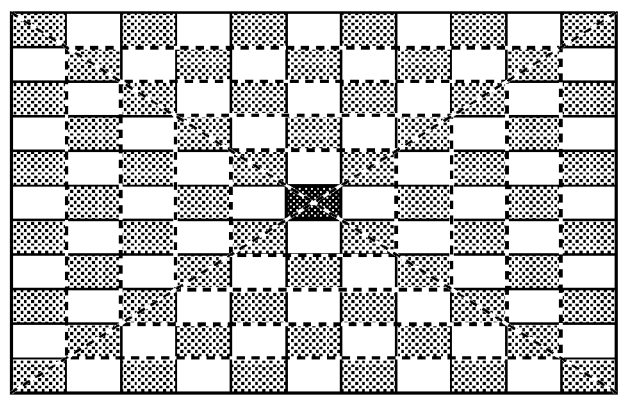

FIGS. 6A and 6B illustrate examples of the test pattern used in the third embodiment. For example, FIG. 6A illustrates a test pattern including a plurality of rectangles that share the center. FIG. 6B illustrates a checkered pattern in which rectangles obtained by equally reducing the vertical and horizontal dimensions of the maximum projection image are arranged. Also, in order to make the center of the test pattern illustrated in FIG. 6B distinctive, the rectangle located at the center is configured to be distinguishable from the other rectangles by color, for example. That is, the test pattern used in the third embodiment is an image including a plurality of rectangles having a predetermined positional relationship. Such a test pattern has the distinctive center and allows a difference or ratio between the dimensions of the image on the screen 700 and the actual dimensions of the projection image to be estimated. Note that the test pattern is not limited to these examples.

Figure 7:
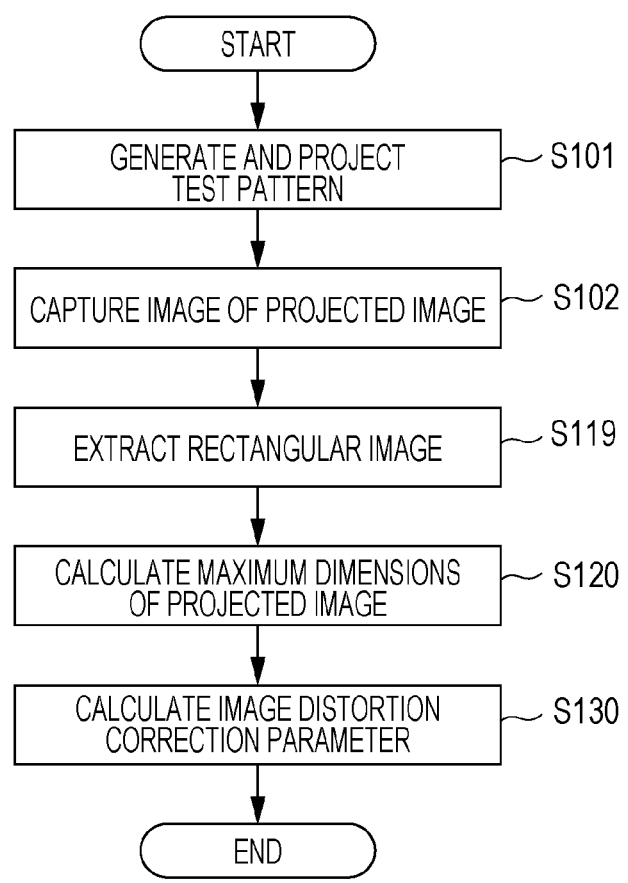
FIG. 7 is a flowchart for describing an operation performed by an image processing apparatus according to the third embodiment.

An operation performed by the image processing apparatus according to the third embodiment will be described with reference to a flowchart of FIG. 7. Steps corresponding to steps illustrating FIG. 2 are assigned the same step numbers. The image processing apparatus according to the third embodiment includes a CPU (not illustrated), and implements individual processing steps illustrated in FIG. 7 as a result of the CPU reading out a program necessary for execution of the process illustrated in FIG. 7 from a memory (not illustrated) and executing the program.

In step S101, the pattern generating unit 100 generates a test pattern such as the one illustrated in FIG. 6A. Then, the projection unit 200 projects the generated test pattern. In step S102, the image capturing unit 300 captures an image of the screen 700 on which the test pattern is projected.

Then, in step S103, the state determining unit 400 identifies a rectangle whose four vertexes are detectable from among a plurality of rectangles included in the test pattern illustrated in FIG. 6A. The process then process to step S120. In step S120, the distortion correcting unit 500 identifies individual vertexes of an image projected at the maximum projection dimensions, on the basis of the rectangles whose four vertexes have been successfully detected. For example, in the case where the test pattern illustrated in FIG. 6A is projected, the distortion correcting unit 500 identifies positions of vertexes of the outermost rectangle, on the basis of the vertexes of the individual rectangles whose four vertexes have been successfully detected. Then, the distortion correcting unit 500 determines an amount of correction (correction parameter) used to correct a distortion of the projection image projected by the projection unit 200, on the basis of the positions of the vertexes of the outermost rectangle identified in step S120. Note that the correction parameter can be determined in the similar manner in the case where the test pattern illustrated in FIG. 6B is used.

In the case where a test pattern such as the one illustrated in FIG. 6B is projected, the state determining unit 400 is capable of perform control for correcting a distortion by identifying individual vertexes of an image projected at the maximum projection dimensions, on the basis of a range detected from the captured image.

As described above, the image processing apparatus according to the third embedment projects a test pattern having the distinctive center and allowing a difference or ratio between the dimensions of an image on the screen 700 and the actual dimensions of a projection image to be estimated. For example, when the test pattern illustrated in FIG. 6A is used, the largest test pattern among test patterns fully projected onto the screen 700 can be found in a short time. Then, by determining the distortion correction parameter using the vertexes of the test pattern, more appropriate distortion correction can be performed even if a projection image of the test pattern extends off the screen 700.

In each of the first to third embodiments above, the example of using a rectangular projection image and detecting four vertexes of the projection image has been described; however, the configuration is not limited to this example.

In accordance with an aspect of the present invention, a distortion of a projection image can be corrected more effectively.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-251393, filed Dec. 4, 2013, which is hereby incorporated by reference herein in its entirety.

What is claimed is:

1. An image processing apparatus comprising:
   a detection unit configured to detect predetermined coordinates from a first captured image obtained by capturing a projection image projected by a projection unit;
   a determining unit configured to determine, using a result of the detection of the predetermined coordinates by the detection unit, whether dimensions of the projection image are to be changed;
   a changing unit configured to change, in a case where the determining unit determines that the dimensions of the projection image are to be changed, the dimensions of the projection image projected by the projection unit to obtain a second captured image based on a resized projection image; and
   a control unit configured to control a distortion correction parameter to be used for correcting a distortion of a projection image projected by the projection unit, in accordance with a detection result of the predetermined coordinates obtained by the detection unit for the second captured image based on the resized projection image in a case where the detection unit detects the predetermined coordinates from the second captured image.

2. The image processing apparatus according to claim 1, wherein the control unit is configured to control the distortion correction parameter to be used for correcting a distortion of the projection image projected by the projection unit, based on a position of the predetermined coordinates detected by the detection unit from the second captured image of the resized projection image.

3. The image processing apparatus according to claim 2, wherein the determining unit is configured to determine to reduce the dimensions of the projection image projected by the projection unit in a case where a predetermined number of the predetermined coordinates is not detected by the detection unit from the first captured image of the projection image.

4. The image processing apparatus according to claim 3, further comprising an identifying unit configured to identify an area of the projection image projected by the projection unit without performing reduction, by using the position of the predetermined coordinates detected from the second captured image of the resized projection image obtained by the changing unit and reduction information on the dimensions to which the dimensions of the projection image is changed by the changing unit,
   wherein the control unit determines the distortion correction parameter, based on the area of the projection image identified by the identifying unit.

5. The image processing apparatus according to claim 2, wherein the determining unit is configured to determine to enlarge the dimensions of the projection image projected by the projection unit to obtain the second captured image based on the enlarged projection image in a case where a predetermined number of the predetermined coordinates are detected by the detection unit from the first captured image of the projection image, and
   wherein the control unit is configured to determine the distortion correction parameter, in accordance with a detection result of the predetermined coordinates obtained by the detection unit for the second captured image based on the enlarged projection image in a case where the detection unit detects the predetermined coordinates from the second captured image.

6. The image processing apparatus according to claim 2, wherein the projection unit projects the projection image in which at least one of luminance and color is different at the predetermined coordinates and at other coordinates.

7. The image processing apparatus according to claim 2, wherein the predetermined coordinates are coordinates of a vertex of the projection image in the captured image.

8. An image processing apparatus comprising:
   an obtaining unit configured to obtain a captured image of a projection image having a predetermined image pattern and projected by a projection unit;
   a detection unit configured to detect a part or whole of the predetermined image pattern from the captured image;
   a determining unit configured to determine an amount of correction used to correct a distortion of the projection image, based on a detection result of the predetermined image pattern from the captured image by the detection unit; and
   a control unit configured to perform control for correcting a distortion of the projection image projected by the projection unit, by using the amount of correction determined by the determining unit for the projection image.

9. The image processing apparatus according to claim 8, wherein the projection image is an image including, as the predetermined image pattern, a plurality of rectangles having a predetermined positional relationship, and
   wherein the determining unit is configured to determine an amount of correction used to correct a distortion of the projection image, based on positions of vertexes of the rectangles detected from the captured image.

10. An image processing method for an image processing apparatus, the image processing method comprising:
    detecting predetermined coordinates from a first captured image obtained by capturing a projection image projected by a projection unit;
    determining, using a result of the detection of the predetermined coordinates, whether dimensions of the projection image are to be changed;
    changing, in a case where it is determined that the dimensions of the projection image are to be changed, the dimensions of the projection image projected by the projection unit to obtain a second captured image based on a resized projection image; and
    controlling a distortion correction parameter to be used for correcting a distortion of a projection image projected by the projection unit, in accordance with an obtained detection result of the predetermined coordinates for the second captured image based on the resized projection image in a case where it is detected that the predetermined coordinates from the second captured image.

11. The image processing method according to claim 10, wherein controlling includes controlling the distortion correction parameter to be used for correcting a distortion of the projection image projected by the projection unit, based on a detected position of the predetermined coordinates from the second captured image of the resized projection image.

12. The image processing method according to claim 11, wherein changing includes reducing the dimensions of the projection image projected by the projection unit in a case where any one of a predetermined number of predetermined coordinates is not successfully detected from a captured image of the projection image.

13. The image processing method according to claim 12, further comprising identifying an area of the projection image projected by the projection unit without performing reduction, by using the position of the predetermined coordinates detected from the obtained second captured image of the resized projection image and reduction information on the dimensions to which the dimensions of the projection image is changed,
 wherein controlling includes determining the distortion correction parameter, based on the identified area of the projection image.

14. A non-transitory computer-readable storage medium storing a program to cause an image processing apparatus to perform an image processing method, the image processing method comprising:

detecting predetermined coordinates from a first captured image obtained by capturing a projection image projected by a projection unit;

determining, using a result of the detection of the predetermined coordinates, whether dimensions of the projection image are to be changed;

changing, in a case where it is determined that the dimensions of the projection image are to be changed, the dimensions of the projection image projected by the projection unit to obtain a second captured image based on a resized projection image; and controlling a distortion correction parameter to be used for correcting a distortion of a projection image projected by the projection unit, in accordance with an obtained detection result of the predetermined coordinates for the second captured image based on the resized projection image in a case where it is detected that the predetermined coordinates from the second captured image.

* * * * *